United States Patent [19]

Wayne et al.

[11] Patent Number: 4,528,668

[45] Date of Patent: Jul. 9, 1985

[54] PROGRAMMABLE MULTIFUNCTION LASER

[75] Inventors: Robert J. Wayne, Berlin; Robert W. Henschke, E. Hampton, both of Conn.; Robert J. Mongeon, E. Longmeadow, Mass.

[73] Assignee: The United States of America as represented by the Secretary of the Army, Washington, D.C.

[21] Appl. No.: 403,458

[22] Filed: Jul. 30, 1982

[51] Int. Cl.$^3$ .............................................. H01S 3/10
[52] U.S. Cl. ....................................... 372/26; 372/27; 372/108
[58] Field of Search ...................... 372/26, 27, 97, 108

[56] References Cited

U.S. PATENT DOCUMENTS

| | | | |
|---|---|---|---|
| 3,277,396 | 10/1966 | Statz et al. | 372/27 |
| 3,648,193 | 3/1972 | Foster et al. | 372/106 |
| 3,918,007 | 11/1975 | Waksberg | 372/27 |
| 4,375,094 | 2/1983 | Kelleher et al. | 369/43 |

Primary Examiner—James W. Davie
Attorney, Agent, or Firm—Anthony T. Lane; Jeremiah G. Murray; Edward Goldberg

[57] ABSTRACT

This multi-format modulated laser may be programmed to produce a variety of output waveforms by applying a different one of a plurality of modulating waveforms thereto. The outputs can include continuous waves, both modulated and unmodulated, Q-switched pulses, cavity dumped pulses, shaped pulses and mode locked pulses. The laser is provided with an intracavity electro-optic modulator and may comprise two coupled cavities with a gain cell in one cavity and the modulator in the other cavity.

6 Claims, 18 Drawing Figures

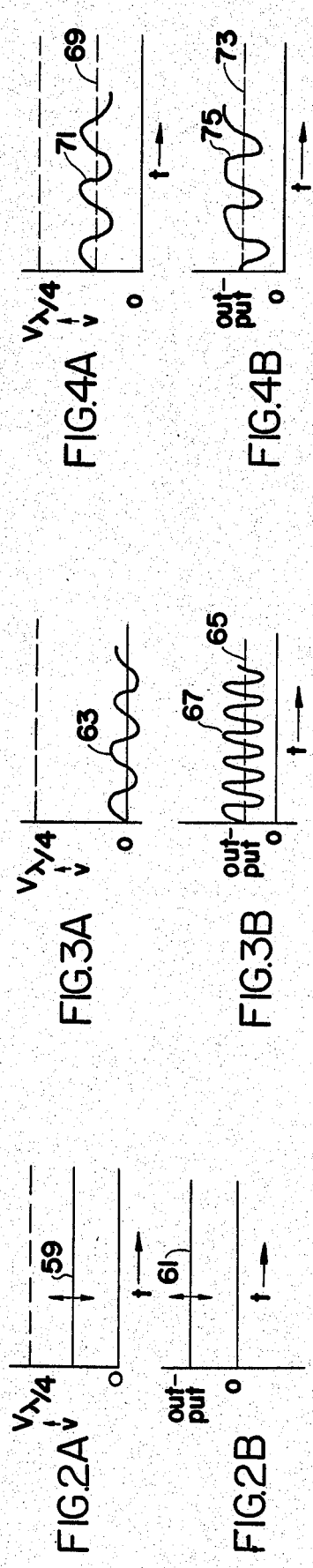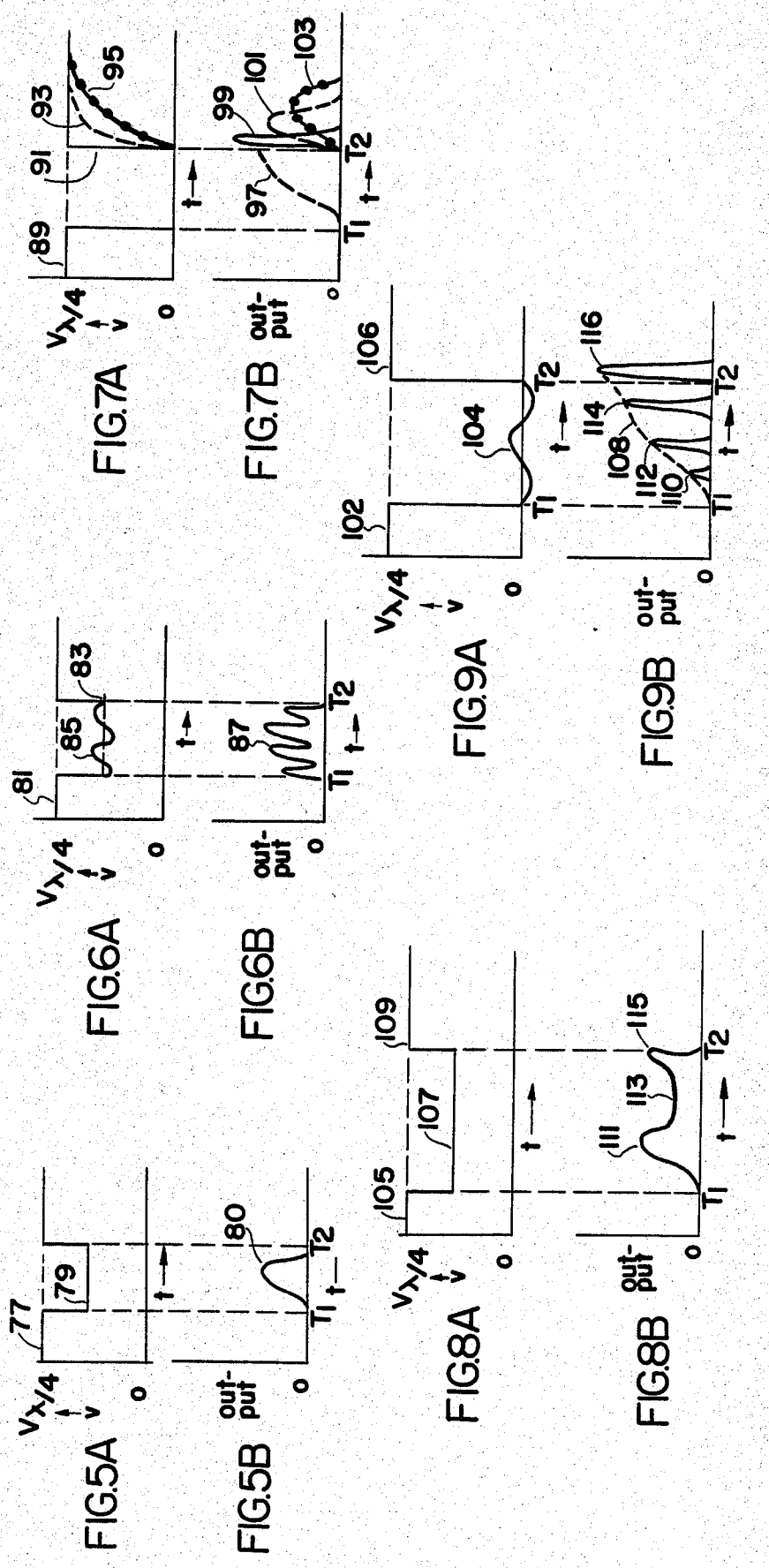

PROGRAMMABLE MULTIFUNCTION LASER

The Government has rights in this invention pursuant to Contract DAAB07-76-C-0920, awarded by the Department of the Army.

BACKGROUND OF THE INVENTION

This invention relates to lasers and more particularly to a laser which can be advantageously used as a transmitter for a multipurpose optical radar, and for other purposes. The laser is particularly adapted for use in airborne radars of this type for use in low flying aircraft. In such an application, optical radars are often required to perform diverse functions such as, terrain following, terrain and obstacle avoidance, Doppler navigation, weapon delivery, radar imaging in two and three dimensions, moving target indication, etc.

No single modulation waveform can efficiently perform such a variety of functions. The present invention provides a laser which can be easily programmed to provide a large variety of modulation formats, which formats can be easily selected merely by changing the modulation waveform applied to the laser. Such a programmable modulated laser can form the transmitter of a multi-function airborne $CO_2$ optical radar. Widely different modulation formats such as continuous wave (cw) at varying power levels, Q-switched pulses, RF modulated waveforms for both cw and Q-switched outputs, Q-switched and cavity dumped formats, as well as combinations of these, for example, shaped pulses comprising an initial high amplitude Q-switch pulse followed by a cw plateau of variable length. Many of these modulation techniques can be combined with mode locking to provide additional versatility.

A continuous wave optical radar transmitter can be used for example as a moving target indicator or for radial velocity measurement. Continuous wave outputs with a sinusoidal modulation are useful for example in three dimensional imaging. Terrain contouring radars require short high energy optical pulses such as can be obtained through Q-switching a laser. Certain experimental three dimensional techniques require Q-switch derived optical pulses with sinusoidal modulation thereon. Q-switching followed by cavity dumping can produce high energy pulses of variable width which are useful in terrain contouring. The aforementioned shaped pulses may be used in pulse Doppler applications wherein the intitial high amplitude pulse provides good radar range as well as range resolution and the lower amplitude trailing edge can be used as a frequency reference to measure target Doppler shift and hence radial velocity. The mode locked formats are useful mostly for experimental three dimensional radar imaging and for obtaining extremely short, high amplitude pulses.

In addition to its use as an optical radar transmitter, the novel laser is valuable as a laboratory signal source.

Various techniques are available for active modulation of $CO_2$ lasers. These include acousto-optic modulation for extracavity frequency shifting and for intracavity mode locking; electo-optic modulation for mode locking, Q-switching and cavity dumping, chirp modulation; and Stark effect modulation for Q-switching as well as cavity dumping.

Intracavity electro-optic modulation offers the widest diversity of modulation formats for a carbon dioxide optical radar transmitter, considering such factors as efficiency, modulation rate, power handling capability, and modulation range. Specifically, an intracavity modulator which utilizes the voltage variable birefringence of a crystal to achieve polarization or coupling modulation offers the widest choice of laser modulated output formats. Such diversity is achieved by optimum design of the laser cavity and/or cavities and the use of a fully programmable voltage surce for application of a wide variety of modulating voltage waveforms to the birefringent crystal.

Intracavity electro-optic modulation of the type described is inherently more efficient and requires lower modulating voltages than extracavity modulators. Also, recent developments have made available high quality, low insertion loss cadmium telluride materials which make ideal modulator crystals for the 10 micron wavelength region. Also the development of a dual cavity laser with an electro-optical modulation system in an auxiliary coupled cavity wherein the power levels are much lower than in the adjacent main cavity has reduced problems associated with high power levels in electro-optic modulator crystals. This dual cavity laser is described and claimed in a co-pending application entitled, MODULATED INFRARED LASER WITH TWO COUPLED CAVITIES, Ser. No. 403,439, filed on July 30, 1982, U.S. Pat. No. 4,498,179.

SUMMARY OF THE INVENTION

The novel programmable multi-format modulated laser of the present invention comprises a $CO_2$ gas laser operating in the 10 micron wavelength region and includes an RF or dc excited gain cell which is constrained to emit only linearly polarized flux of one direction, with an intracavity modulator system comprising a low loss birefringent crystal, preferably of antireflection (AR) coated cadmium telluride, with electrodes thereon, plus a polarization coupler plate set at its Brewster angle relative to the laser's optical axis such that it couples out of the laser optical flux having polarization orthogonal to that emitted by said gain cell, and a programmable voltage source connected to the modulator electrodes, the voltage source being capable of selectively applying a variety of modulating waveforms to the modulator crystal, for example, variable and fixed dc biases, sinusoidal waveforms or combinations of sinusoidal waveforms with dc bias, square waves which vary between the modulator's quarter wave voltage and zero voltage, with intermediate levels, as well as pulses of variable rise times to produce various cavity dumped pulses following Q-switching.

It is thus an object of this invention to provide a laser capable of being modulated in various formats.

Another object is to provide a transmitter for a multi-function airborne optical radar.

These and other objects and advantages of the invention will become apparent from the following detailed description and the drawings.

BRIEF DESCRIPTION OF THE DRAWINGS

FIGS. 2A, 3A, 4A, 5A, 6A, 7A, 8A, and 9A show modulation waveforms which can be applied to the laser modulator.

FIGS. 2B, 3B, 4B, 5B, 6B, 7B, 8B, and 9B show laser outputs resulting from the application of such modulation waveforms.

DETAILED DESCRIPTION OF A PREFERRED EMBODIMENT

Figure 1:
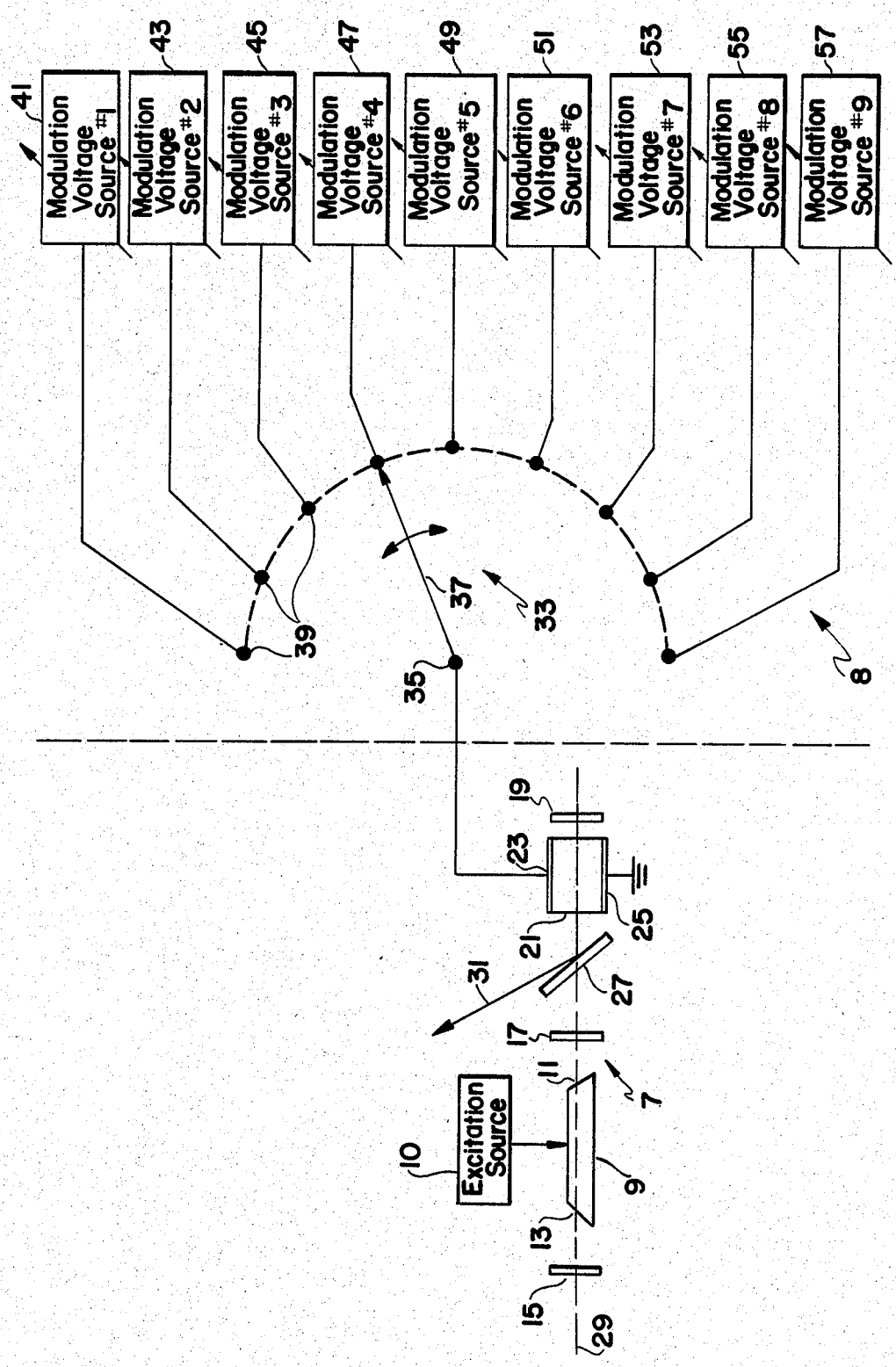
FIG. 1 is a schematic illustrating a preferred embodiment of the invention.

The apparatus of FIG. 1 includes a laser 7 to the left of the vertical dashed line with a multifunction modulation programmer 8, to the right of said line, connected thereto, whereby the output 31 of the laser may be selectively modulated with various formats. The laser shown is of the dual cavity type, intracavity modulated by an electro-optic modulator in the auxiliary or low power cavity, of the type described in the aforementioned co-pending application. The laser includes a pair of coupled cavities arranged along a common optical axis 29. The main cavity comprises the space between mirrors 15 and 17, and the coupled low power cavity comprises the space between mirrors 17 and 19. The main cavity includes gain cell 9 which is suitably RF or dc excited by excitation source 10. The transmission windows 11 and 13 permit only linearly polarized flux to exit the gain cell. The mirror 17 has low intrinsic reflectively and the other two mirrors are highly reflective. The length of the coupled cavity is tuned to increase the effective reflectivity of mirror 17 and thus permit cw oscillation to take place in both cavities, but with reduced power levels in the coupled cavity, when little or no power is coupled out of the laser by the modulator, as explained in greater detail in the aforementioned co-pending application.

The modulation system of the coupled cavity includes modulator crystal 21 which is a suitable crystal which exhibits voltage controllable birefringence, such as AR coated cadmium telluride. The modulator electrodes 23 and 25 are provided for application of modulating voltages to the crystal. The modulator operates in known fashion to change the direction of polarization of the optical flux emitted by the gain cell so that it may be coupled out of the laser along path 31 upon reflection from polarization coupler 27, which is set at its Brewster angle to optical axis 29.

For illustration purposes the modulation programmer 8 comprises a rotary selector switch 33 which has its rotating arm 37 connected to terminal 35 which is connected to electrode 23. By rotating arm 37 different ones of the nine stationary terminals 39 may be contacted to connect a different one of nine modulation voltage sources 41, 43, 45, 47, 49, 51, 53, 55, and 57 to the modulator of the laser to provide different laser waveforms at output 31. The programmer 8 is a schematic representation only, and thus this apparatus could take other forms; for example, instead of the electromechanical rotary switch shown, a push button arrangement could be used to select the desired modulation voltage source, or different modulating voltages might be generated by a single voltage source capable of producing all the required waveforms.

The modulating voltage source #1 may be designed to produce continuous wave laser outputs with adjustable amplitudes. This would require a dc bias which is adjustable to different levels between zero and the quarter wave voltage of modulator crystal 21 so that varying amounts of the vertically polarized flux emitted by gain cell 9 will be converted to horizontal or orthogonally polarized flux capable of being coupled out along output path 31 by the polarization coupler 27. In order to sustain cw oscillation, the bias voltage, shown as horizontal line 59 in FIG. 2A must be sufficiently below the crystal quarter wave voltage, indicated by the dashed line labelled $V_{\lambda/4}$ in FIG. 2A, to leave sufficient circulating flux within the two cavities to sustain cw operation. As the positive bias is lowered toward zero, less flux is coupled out and more remains in the two cavities as circulating flux. The cw laser power output is indicated by the horizontal line 61 of FIG. 2B, the double-headed arrow indicating that the level is variable. The oblique arrows through the nine modulation voltage sources indicate that these may be variable or adjustable by suitable controls to provide for example, the variable dc bias required for modulation voltage source #1.

Figure 10:
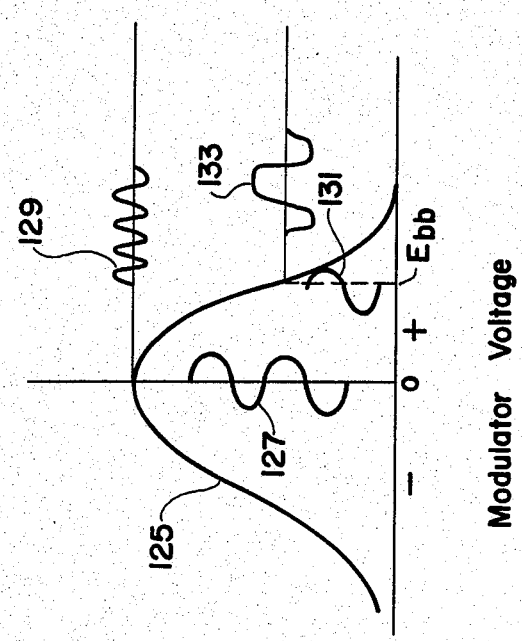
FIG. 10 is the transfer characteristic of a birefringent electro-optic modulator.

The modulation voltage source #2 may comprise means for producing RF modulated laser outputs. If an RF sine wave, like that shown at 63 in FIG. 3A, and having an amplitude smaller than the crystal quarter wave voltage $V_{\lambda/4}$, is applied to the modulator, the laser will produce a continuous optical wave output with sinusoidal modulation thereon, as shown in FIG. 3B. The output therein comprises an average level 65 with the RF sinusoidal component 67 thereon. The modulation 67 is at twice the frequency of the modulating voltage 63. This results from the fact that the transfer characteristic of the laser modulator is a double-valued curve, such as the bell-shaped curve 125 of FIG. 10. The abcissa in FIG. 10 represents the modulator voltage. With only a sine wave such as 127 applied to the modulator, the laser output frequency is doubled, as shown by output waveform 129.

FIG. 4A represents a modulating voltage comprising an RF sine wave 71 plus a fixed dc bias level 69 which is greater than the peak sine wave amplitude. In this case the laser waveform, as shown in FIG. 4B, would be a distorted sine wave 75, with its fundamental frequency the same as that of the modulating sine wave. This situation is also illustrated in FIG. 10 which shows the dc bias level as $E_{bb}$ with the modulating sine wave of 131 superimposed thereon. The wave 133 represents the laser output for this situation. The curvature of the curve 125 produces the distortion in the output wave 133. The modulation source #3 may be adapted to produce such a modulating voltage.

The modulation source #4 of FIG. 1 may comprise a modulating waveform adapted to produce Q-switched laser output pulses. As is known in the art a modulated laser such as that of FIG. 1 will not oscillate continuously if the modulator has the quarter wave voltage applied thereto, since in this condition the polarization of the laser energy passing round trip through the modulator is changed from the vertical polarization emitted by the gain cell to orthogonal or horizontal polarization which is coupled out of the laser by polarization coupler 27. This leaves insufficient circulating flux in the cavity or cavities to sustain cw laser operation, however the continuous operation of the excitation source 10 provides a form of stored energy in the excited states of the laser medium, which in this case is $CO_2$ gas. If the modulator voltage is quickly reduced from the quarter wave value to some intermediate value above zero, the laser will be Q-switched and the stored energy in the medium can provide a large optical pulse which can be coupled out of the laser. Such pulses can be periodically produced at a periodic PRF to form the transmitted pulses of an optical terrain contouring radar. FIG. 5A shows a modulating waveform required to produce such a Q-switched pulse. The modulator voltage is held at the quarter wave level 77 long enough for the laser to become quiescent and is then rapidly pulsed to intermediate positive level 79 at time $T_1$, and held there until time $T_2$ when the voltage returns to the quarter wave value. FIG. 5B shows the laser output pulse, 80. Just after time $T_1$ the pulse 80 starts to build up, drawing on the aforementioned stored energy to provide a pulse larger than the largest cw amplitude available from the laser. When the peak of this Q-switched pulse is past at time $T_2$, the modulator voltage goes to quarter wave so that the laser oscillation is terminated. Such Q-switched pulses can be produced at PRF's up to 300 kHz with pulse widths of 100 to 500 nanoseconds.

If the intermediate voltage level 79 of FIG. 5A has a sinusoidal component superimposed thereon, the Q-switched pulse can be modulated in accordance with the sinusoidal component. The modulation voltage source #5 may be arranged to produce such a modulating waveform, which is shown in FIG. 6A. This waveform has an initial portion 81 at the quarter wave voltage followed by the intermediate level 83, starting at $T_1$, with the RF sinusoid 85 superimposed thereon, then returning to the quarter wave level at $T_2$. The Q-switched and modulated output pulse 87 is shown in FIG. 6B.

Extremely fast, high power symmetric cavity dumped pulses with no low level tail energy can be obtained if the laser is Q-switched with no output coupling until the peak of the Q-switched internal energy build-up occurs, at which point the output coupling is switched to its maximum level. Both PRF rates and pulse widths are electro-optically variable. The modulation voltage source #6 may be arranged to produce a modulating waveform such as that of FIG. 7A for this purpose. In FIG. 7A the modulator voltage is held at quarter wave level 89 until the laser stops oscillating and becomes quiescent. At time $T_1$, it is switched to the zero level at which time Q-switching occurs but output coupling is zero so that the internal energy rapidly builds up along dashed curve 97 of FIG. 7B. At the peak of this buildup, at time $T_2$, the modulator is switched back to quarter wave voltage to provide maximum output coupling. This rapidly dumps the cavity Q-switched energy to the output. The pulse width and amplitude can be controlled by changing the rate of rise of the modulator voltage to the quarter wave value. As shown in FIGS. 7A and 7B, if the modulator voltage rises rapidly along solid line curve 91, a short high amplitude pulse 99 will result. If the voltage rises along dashed line curve 93, the smaller, wider pulse 101 will result. Slower rise times, for example along dotted curve 95 will result in a still smaller and wider output pulse, such as dotted curve 103.

The Q-switching techniques illustrated in FIGS. 5A and 5B can be modified to produce a pulse with a large Q-switched initial portion followed by a cw level of lower amplitude and terminated if desired by a small cavity dumped spike. The modulation voltage source #7 may be arranged to produce a waveform such as that of FIG. 8A for this purpose. In FIG. 8A the modulator voltage is held at quarter wave level 105 until time $T_1$ at which time it switches to the intermediate positive level 107. The laser Q-switches just after $T_1$ and the Q-switched pulse 111 is coupled out, as shown in FIG. 8B. After the Q-switch peak 111, the output level decays to a cw level 113 as long as the modulator voltage is held at level 107. If at the time $T_2$, the modulator voltage is returned to the quarter wave level 109, as shown in FIG. 8A, the energy circulating in the cavities will be rapidly dumped to the output, producing cavity dumped spike 115, after which the pulse terminates. This spike can be used as a marker to denote the end of the pulse.

FIGS. 9A and 9B show how the laser of FIG. 1 can be modulated to produce ultra short, high amplitude mode locked optical pulses. In this example, the modulation voltage source #8 would be arranged to produce the waveform of FIG. 9A, in which the voltage is at the quarter wave level for a period 102 until time $T_1$, when a sinusoidal voltage 104 appears. In order to achieve mode locking, this voltage 104 must have an amplitude low enough so that no appreciable output coupling results therefrom and its frequency must be correlated with the laser cavity round trip transit time. The modulator voltage sinusoid 104 must have a period which is an integral multiple of the round trip cavity transit time of the optical energy therein. Between the times $T_1$ and $T_2$, the mode locked pulse will oscillate back and forth within the cavity or cavities and will build up in amplitude along the envelope curve 108 of FIG. 9B. The pulses 110, 112, and 114 represent a mode locked pulse after each round trip through the laser. The pulse is seen to rapidly increase in amplitude within the laser. When a desired high amplitude is reached the pulse can be coupled out by switching the modulator to the quarter wave voltage. This is done at time $T_2$ and the resulting output pulse is shown at 116 in FIG. 9B.

Modulation voltage source #9 may be reserved for another modulating waveform to produce another type of modulated laser output.

While the invention has been described in connection with illustrative embodiments, variations therein will be apparent to those skilled in this art without the exercise of invention, accordingly the invention should be limited only by the scope of the appended claims.

We claim:

1. A programmable multi-format modulated laser, comprising:
    a main resonant cavity including a gain cell positioned along an optical axis, a source of excitation coupled to said cell, a gaseous lasing medium within said gain cell and a pair of windows at opposite ends, said gain cell constrained to emit only linearly polarized optical flux along one direction, intracavity modulation coupling means axially aligned with said main cavity including a birefringent crystal modulator with electrodes thereon for application thereto of modulation voltages and a polarization coupler set at the Brewster angle to the optical axis to couple out of said laser optical flux polarized orthogonally to that emitted by said gain cell, a plurality of mirrors including first and second highly reflective mirrors positioned at respective opposite ends of said main cavity and intracavity coupling means and a third low reflectivity mirror between said main resonant cavity and intracavity means, and a programmable modulation voltage source means connected to said modulator electrodes, said voltage source means including a plurality of sources of different modulation voltage waveforms, and switching means for selectively applying one of said plurality of sources to said modulator crystal for a predetermined time interval.

2. The laser of claim 1 wherein said birefringent crystal comprises an anti reflection coated cadmium telluride crystal and said polarization coupler is a gallium arsenide plate.

3. The laser of claim 1 wherein said plurality of sources of different modulation voltage waveforms include variable and fixed direct current biases, sinusoidal waveforms, sinusoidal waveforms combined with direct current bias, square waves which vary between the modulator quarter wave voltage and zero including intermediate levels and variable rise times for producing continuous wave laser outputs, Q-switched pulses, cavity dumped pulses, shaped pulses, and mode locked pulses.

4. The laser of claim 3 wherein said switching means is a rotary selector switch.

5. The laser of claim 1 wherein said intracavity modulation coupling means is an adjacent coupled cavity, the coupling between said cavities providng a power level in said coupled cavity substantially lower than that in said main laser cavity.

6. The laser of claim 1 wherein said gain cell contains $CO_2$ as the lasing medium, said crystal being an electro optic modulator providing intracavity polarization and coupling modulation.

* * * * *